UNITED STATES PATENT OFFICE.

JOHN PROSSER, OF OTTUMWA, IOWA.

IMPROVEMENT IN EXTRACTING METALS FROM THEIR ORES.

Specification forming part of Letters Patent No. 206,610, dated July 30, 1878; application filed February 26, 1878.

*To all whom it may concern:*

Be it known that I, JOHN PROSSER, of Ottumwa, in the county of Wapello and State of Iowa, have invented a new and Improved Process of Extracting Metals from their Ores; and I do hereby declare that the following is a full, clear, and exact description of the same.

My invention relates to an improved process of separating gold, silver, and copper from the earthy matters in mixed ores containing these metals.

The process consists in combining the ores with a flux composed of sulphate of iron, salt, (chloride of sodium,) black oxide of manganese, and saltpeter, to which latter a proportion of charcoal has been previously added while in a melted state, then subjecting them in closed retorts to a dull-red heat without access of air, to chloridize the metals, and finally washing out the metal chlorides, as hereinafter fully described.

In carrying out my invention, to every hundred pounds of ore of average quality I add ten pounds of sulphate of iron and ten pounds of common salt, (chloride of sodium,) and, when gold is present, about one pound of black oxide of manganese and five pounds of saltpeter, made into what I call a fixed alkali by the addition of charcoal while in a melted state. These ingredients are thoroughly mixed with the ore, and the whole tightly luted in a retort or crucible so as to exclude the air, and then subjected to a dull-red heat for from six to twenty hours.

The proportion of the materials used and the time of treatment must be regulated by the character of the ore, as, for instance, when much pyrites is present in the ore, the heat must be kept up proportionately longer. The time of the completion of the process may generally be determined by noticing when the sulphur-fumes fail to pass off.

The form of retort used is a cast-iron or earthenware box about two feet square, with a lid to each, arranged in a row above a suitable fire-chamber, and each box having communication with a pipe leading down into a tank or trough of water, which catches and dissolves any metal which the fumes may carry over. After the process, which resembles that of cementation, is complete the metals will be found to have become converted into chlorides, which are then washed out, and the parting of the same effected by well-known methods.

In defining my invention more clearly, I would state that I am aware that ores have been desulphurized by treatment in a furnace in the presence of air with a flux composed of manganese, chloride of sodium, sulphate of magnesia, nitrate of potash, (saltpeter,) and carbon, and I therefore fully disclaim said process.

Having thus described my invention, what I claim as new is—

The process herein described of extracting metals, which consists in mixing the ores with a flux composed of sulphate of iron, salt, black oxide of manganese, and saltpeter, made into a fixed alkali by the addition of charcoal, as described, then subjecting them in closed retorts to a dull-red heat without access of air, to chloridize the metals, and finally washing out the metal chlorides, substantially as herein described.

The above specification of my invention signed by me this 23d day of February, 1878.

JOHN PROSSER.

Witnesses:
 EDWD. W. BYRN,
 SOLON C. KEMON.